United States Patent
Nyssen et al.

(12)

(10) Patent No.: US 9,442,347 B1
(45) Date of Patent: Sep. 13, 2016

(54) COLLAPSIBLE PHOTO ENCLOSURE

(71) Applicant: Amazon Technologies, Inc., Seattle, WA (US)

(72) Inventors: Gregory James Nyssen, Seattle, WA (US); Andrew Wayne Barber, Avon, IN (US); Adam Douglas Hand, Cincinnati, OH (US); Robert James Hollins, Charlestown, IN (US); Fabrice Koukoui, Loiret (FR); Cameron Bo Logsdon, Cincinnati, OH (US); Michael Paul Nelson, Seattle, WA (US); Hideaki Omori, Inzai (JP); David Sepeau, Loiret (FR); Gurkirat Singh, Punjab (IN); Suchita Sitani, Goa (IN); Yosuke Yano, Tokyo (JP)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/712,284

(22) Filed: May 14, 2015

(51) Int. Cl.
*G03B 15/02* (2006.01)
*G03B 15/07* (2006.01)

(52) U.S. Cl.
CPC ..................... *G03B 15/07* (2013.01)

(58) Field of Classification Search
USPC ................... 396/4, 681; 362/3, 11
See application file for complete search history.

(56) References Cited

U.S. PATENT DOCUMENTS

| | | | | |
|---|---|---|---|---|
| 1,754,663 A * | 4/1930 | Adams | ..................... | A45C 3/02 190/115 |
| 4,490,776 A | 12/1984 | Kluch | | |
| 7,055,976 B2 * | 6/2006 | Blanford | ................ | G03B 15/06 229/103 |
| 7,396,148 B1 * | 7/2008 | Tsai | ....................... | G03B 15/03 362/17 |
| 7,431,172 B1 * | 10/2008 | Spindel | ............. | B65D 11/1853 217/15 |
| 7,680,401 B1 * | 3/2010 | Adelstein | ................ | A45C 9/00 396/1 |
| 2015/0370146 A1 * | 12/2015 | Johnson | ................ | G03B 15/07 396/4 |

OTHER PUBLICATIONS

Shotbox Pop-Up Photo Light Studio, retrived from https://www.kickstarter.com/projects/695573783/shotbox-tabletop-photo-light-studio on Sep. 4, 2015, 5 pages.

SOOC Studio, retrieved from http://whitebison.co.za/products/sooc-studio on Sep. 4, 2015, 5 pages.

* cited by examiner

*Primary Examiner* — Clayton E Laballe
*Assistant Examiner* — Warren K Fenwick
(74) *Attorney, Agent, or Firm* — Lee & Hayes, PLLC

(57) ABSTRACT

An example enclosure includes a base, a plurality of walls extending from the base, and a top disposed opposite the base and connected to at least one of the plurality of walls. The at least one wall includes a light assembly configured to illuminate an interior space of the enclosure at least partly defined by the base and the plurality of walls. The top is moveable toward the base to transition the enclosure from an expanded state to a collapsed state. Additionally, the at least one wall includes a first panel and a second panel movable relative to the first panel. Further, the first and second panels extend substantially parallel to the base when the enclosure is in the collapsed state.

21 Claims, 7 Drawing Sheets

COLLAPSIBLE PHOTO ENCLOSURE

BACKGROUND

The Internet has evolved as a useful tool for the exchange of goods, and various online marketplaces or other websites now enable users to list items for sale with relative ease. As part of this process, the user may capture an image of the item he or she wishes to sell, and may upload the image to the respective website when generating a listing on the website. The operators of such websites generally have relatively strict image quality requirements that must be satisfied before the image may be uploaded. For example, website operators typically require that the image of the item is free from shadows. Such website operators also typically require the image to have a minimum level of sharpness, brightness, and/or clarity before permitting the image to be uploaded.

While existing photo or digital imaging systems may enable a user to capture an image of an item using a smart phone, a digital camera, or other like imaging device, the images obtained using such systems usually do not satisfy the image quality requirements describe above. In particular, such systems do not enable the user to obtain shadowless images. Further, such systems typically have limited lighting capabilities and, as a result, the images obtained using such systems are of relatively poor quality. Additionally, such systems are not easily transportable or storable without significant disassembly.

BRIEF DESCRIPTION OF THE DRAWINGS

This detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
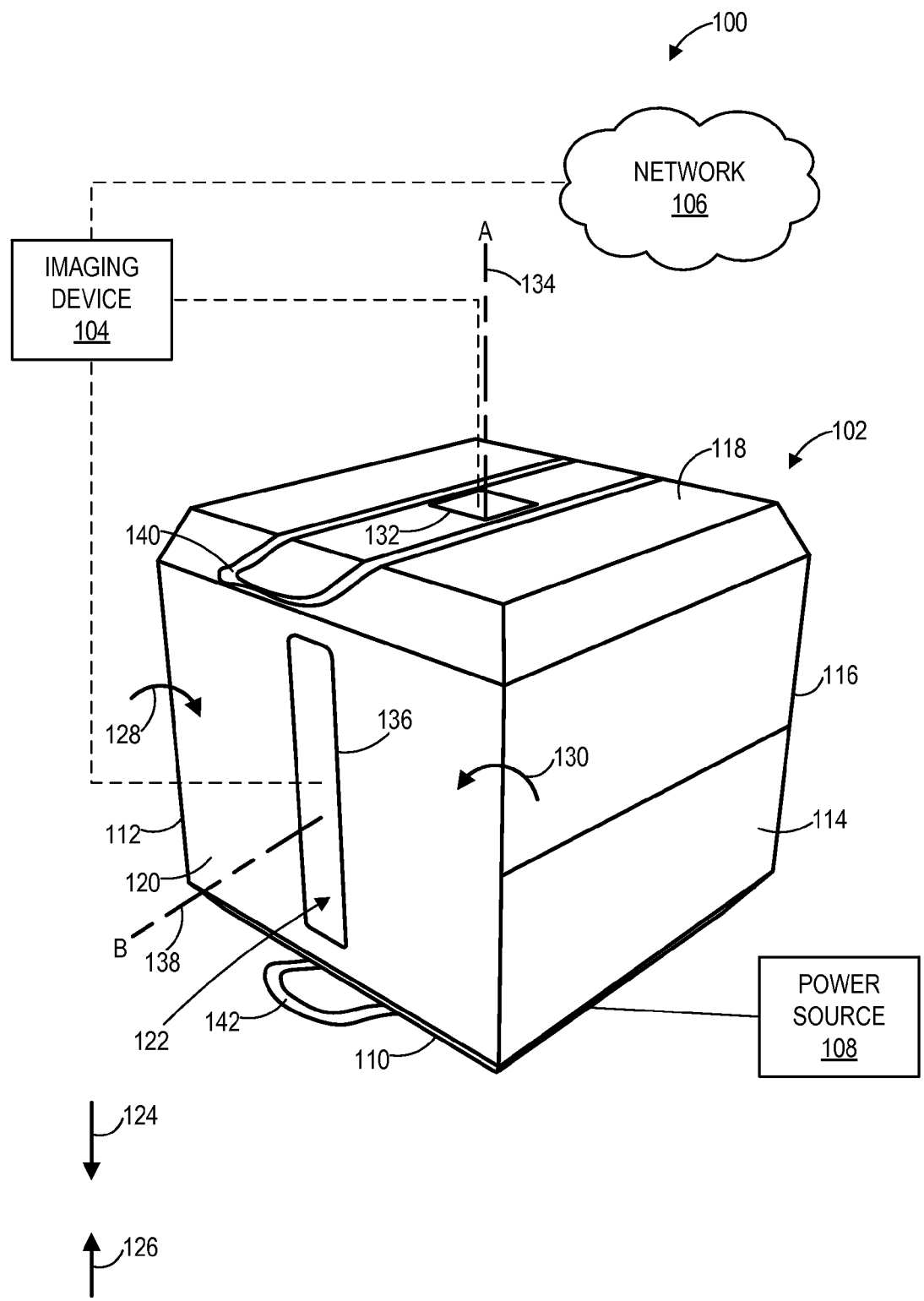
FIG. 1 illustrates an example system for capturing an image of an item.

Described herein are systems and methods related to a collapsible photo enclosure used for capturing images of an object suitable for use in an online marketplace or other website. The example systems of the present disclosure may be configured to enable a user to capture such an image using, for example, a smart phone, a digital camera, a tablet computer, a laptop, and/or other electronic device having image capture capabilities. The systems may be shaped, sized, and/or otherwise configured to accept a variety of different items of various shapes, sizes, or dimensions. Additionally, the systems of the present disclosure may include one or more light assemblies configured to illuminate an interior space of the enclosure within which the item has been disposed. Further, such systems may include one or more layers of diffusion material overlaying at least a portion of the light assemblies. Such materials may assist in dispersing the light generated by such light assemblies so as to improve lighting conditions within the interior space. As a result, example systems of the present disclosure may facilitate capturing digital images that are substantially free from shadows or other undesirable irregularities. Additionally or alternatively, example systems of the present disclosure may reduce and/or substantially eliminate the specular reflection of light within the interior space. Such systems may also be configured to yield digital images having relatively high levels of clarity, sharpness, brightness, and/or other visual characteristics. Further, the systems of the present disclosure may comprise enclosures that are easily transitioned between an expanded state configured to facilitate capturing digital images, and a collapsed state convenient for transporting and/or storing such an enclosure. Additionally, such enclosures may be constructed of relatively inexpensive materials so as to be affordable by small businesses or individuals.

In an example embodiment, an enclosure of the present disclosure may include a base, first and second sidewalls extending substantially perpendicularly from the base, and a back wall extending from the first sidewall to the second sidewall. The enclosure may also include a top disposed opposite the base and connected to at least one of the first sidewall, the second sidewall, or the back wall. In such examples, at least one of the sidewalls, the back wall, the base, or the top may include a light assembly configured to illuminate the interior space of the enclosure. In such examples, the top may be movable toward the base in order to transition the enclosure from the expanded state to the collapsed state. Additionally or alternatively, the base may be movable toward the top in order to transition the enclosure from the expanded state to the collapsed state.

In some examples, the first sidewall may be foldable, bendable, and/or otherwise movable in a first direction toward the interior space as the enclosure is transitioned from the expanded state to the collapsed state. Likewise, the second sidewall may be foldable, bendable, and/or otherwise movable in a second direction toward the interior space as the enclosure is transitioned from the expanded state to collapsed state. The first and second sidewalls may include, for example, one or more score lines or other like seams configured to facilitate such folding or bending. The first and second sidewalls may also include respective tension mechanisms connected thereto. When engaged, the tension mechanisms may impede or prevent folding or bending of the respective sidewalls and, thus, may be configured to maintain the enclosure in the expanded state. Additionally, in some embodiments the first sidewall may include a first panel and a second panel disposed opposite the first panel, and the second sidewall may include a similar configuration. In such embodiments, engaging the tension mechanism of the first sidewall may draw the first panel of the first sidewall toward the second panel of the first sidewall. Likewise, engaging the tension mechanism of the second sidewall may draw the first panel of the second sidewall toward the second panel of the second sidewall.

Moreover, at least one of the walls of the enclosure may include a layer of semi-transparent diffusive material. The various layers of diffusive material included in the enclosure may assist in dispersing light and/or other radiation emitted by the light assemblies within the interior space in order to maximize the illumination capabilities of the enclosures. Such layers may also form one or more surfaces of the interior space. Accordingly, such layers may be off-white, pure white, silver, and/or any other color desirable for forming a contrasting background for the image being captured.

Since the various example enclosures described herein enable users to obtain digital images that are of relatively high quality and that are substantially free from shadows, such images generally do not require further manipulation or processing in order to satisfy the image quality requirements of most online marketplaces or other such websites. In particular, the diffusive materials and other configurations of such enclosures may be configured to reduce and/or substantially eliminate the level of specularity within the interior space and, thus, may facilitate obtaining substantially shadowless images of items disposed within the enclosure. As a result, the user may upload and/or use such images without the added cost, time, and inconvenience associated with such additional image processing. The collapsible enclosures of the present disclosure are also relatively easy to store and/or transport. Such capabilities solve a need that is not currently met by existing imaging systems and methods.

Referring now to FIG. 1, a detailed example of a system 100 for capturing photos or other images of an item is illustrated. The example system 100 of FIG. 1 may include, among other things, an enclosure 102 configured to house the item being photographed, an imaging device 104 configured to obtain a photo and/or other image of the item while the item is disposed within the enclosure 102, a network 106 configured for uploading, downloading, and/or otherwise transferring the image from the imaging device 104 to one or more additional devices (not shown), websites, servers, networks, and/or other locations or components accessible via the network 106, and a power source 108 selectively coupled to the enclosure 102.

The imaging device 104 may comprise, for example, a wireless phone, a tablet computer, a laptop computer, a digital camera, and/or any other device including photo, video, and/or digital imaging functionality. For example, the imaging device 104 may comprise a smart phone having a camera configured to capture video and/or digital images of an object disposed within a field of view of the camera. In such examples, the imaging device 104 may include one or more processors configured to execute stored instructions and/or to control operation of the camera in response to one or more inputs received from a user of the imaging device 104. The processors may comprise one or more cores, and may be configured to generate one or more user interfaces ("UI") configured to assist the user in operating the camera, capturing an image of an object, storing the image, and/or transferring the image from the imaging device 104 to another device and/or location via the network 106. In some examples, the imaging device 104 may include one or more input/output ("I/O") interface(s) to allow the imaging device 104 to connect to the network 106 and/or to communicate with other devices. The I/O interfaces may comprise inter-integrated circuits ("12C"), serial peripheral interface buses ("SPI"), universal serial buses ("USB"), RS-232, media device interfaces, and so forth. The imaging device 104 may also include one or more I/O devices such as, for example, one or more displays, keyboards, mice, touchpads, touchscreens, and/or other such components. The one or more displays may be configured to provide visual output to the user. For example, the displays may be connected to the processor(s) of the imaging device 104 and may be configured to render and/or otherwise display content thereon. Such content may include, for example, the one or more UIs described above and/or one or more images of the item captured using the camera of the imaging device 104.

The imaging device 104 may also include one or more communication interfaces configured to provide a connection with and facilitate the transfer of data, images, video, files, and/or other information via the network 106. In such examples, the network 106 may include one or more personal area networks ("PAN"), local area networks ("LAN"), wide area networks ("WAN"), the internet, and so forth. For example, the communications interfaces of the imaging device 104 may include radio modules for a WiFi LAN and a Bluetooth PAN.

The imaging device 104 may also include one or more memories. The memory may comprises one or more non-transitory computer-readable storage media ("CRSM"). The CRSM may comprise one or more of an electronic storage medium, a magnetic storage medium, an optical storage medium, a quantum storage medium, a mechanical computer storage medium and so forth. The memory may provide for storage of computer readable instructions, data structures, program modules, and other data for the operation of the imaging device 104. The memory may be connected to the camera of the imaging device 104 and may also be configured to store data, images, video, files, and/or other information captured by the camera, such as images of an object disposed within the enclosure 102.

In some examples, the memory of the imaging device 104 may be fixedly connected to the imaging device 104. Additionally or alternatively, the memory may be removably connected or coupled to the imaging device 104. For example, the imaging device 104 may also include additional data storage devices (removable and/or non-removable) such as, for example, magnetic disks, optical disks, or tape. The additional data storage devices may include volatile and nonvolatile, removable and non-removable media implemented in any method or technology for storage of information, such as computer readable instructions, program modules, data, images, video, files, and/or other information.

The example enclosure 102 illustrate in FIG. 1 may comprise a collapsible photo enclosure configured to facilitate capturing images of various objects disposed therein. The various structures and/or other components of the enclosure 102 may be configured such that images captured using the enclosure 102 may be substantially free from shadows, imperfections, and/or other irregularities. In addition, the internal surfaces and/or other structures of the enclosure 102 may provide a substantially white background for such images, thereby enhancing the contrast, clarity, brightness, sharpness, and/or other visual characteristics of such images, regardless of the various shapes, sizes, contours, and/or colors of the item being imaged. Further, the enclosure 102 may include one or more light assemblies to further increase the quality of the images obtained, to assist in substantially eliminating shadows, imperfections, and/or other irregularities in such images, and to reduce and/or substantially eliminate specular reflection of radiation emitted by the light assemblies. As will be described in further detail below, the enclosure 102 may be configured to transition between an expanded state (shown in FIG. 1) in which the enclosure 102 may be used in the image capture process, and a collapsed state (FIGS. 4 and 5) in which the enclosure 12 may be easily transported or stored.

As shown in FIG. 1, the enclosure 12 may include a plurality of walls configured to substantially surround, substantially enclose, and/or otherwise define at least part of an interior space of the enclosure 102 when in the expanded state. While illustrated in FIG. 1 as being substantially cube-shaped, in further examples, the enclosure 102 may be substantially cylindrical, substantially spherical, substantially pyramid-shaped, and/or any other three-dimensional shape when in the expanded state. Additionally, one or more of the walls may comprise an outer surface and/or an inner surface of the enclosure 102. Such outer surfaces of the enclosure 102 may be durable, substantially water resistant, substantially tear resistant, and in some examples, substantially rigid so as to provide a protective outer layer of the enclosure 102. Such inner surfaces, on the other hand, may be matted white, silver, off-white, pure white, and/or any other like color to assist in generating substantially shadowless images. Such inner surfaces may also be at least semi-transparent, at least partially reflective, and/or configured to at least partially diffuse light emitted by the one or more light assemblies of the enclosure 102. As a result, the inner surfaces and/or inner layers of the enclosure 102 may be configured to reduce and/or substantially eliminate specular reflection of radiation emitted by the light assemblies. By minimizing and/or substantially eliminating specularity, the images captured using the enclosure 102 may be substantially shadowless and/or otherwise substantially free from imperfections, and/or other irregularities.

In some examples, the enclosure 102 may include at least one of a base 110 disposed at the bottom of the enclosure 102, one or more sidewalls 112, 114 extending from the base 110, a back wall 116 extending from the base 110, a top 118 disposed opposite the base 110, or a front wall 120 disposed opposite the back wall 116. For example, in the expanded state shown in FIG. 1 a first sidewall 112 of the enclosure 102 may extend substantially perpendicularly from the base 110 and the top 118, and a second sidewall 114 of the enclosure 102 may be disposed opposite the first sidewall 112. In such examples, the second sidewall 114 may extend substantially parallel to the first sidewall 112, and may extend substantially perpendicularly from the base 110 and the top 118. Additionally, in the expanded state shown in FIG. 1 the back wall 116 may extend substantially perpendicularly from the base 110 and the top 118, and the back wall 116 may extend from the first sidewall 112 to the second sidewall 114.

Two or more adjacent components of the enclosure 102 may be stitched, sealed, adhered, fused, molded, combined, and/or otherwise connected through any known connection process. For example, the top 118 may be connected to the back wall 116 as well as to the first and second sidewalls 112, 114. Further, the first and second sidewalls 112, 114 may be connected to the back wall 116. Additionally, the base 110 may be connected to the first and second sidewalls 112, 114 as well as to the back wall 116. In this way, the top 118, the back wall 116, the first and second sidewalls 112, 114, and/or the base 110 may define at least part of an interior space 122 of the enclosure 102. In some examples, the front wall 120 may be connected to at least one of the top 118, the base 110, the first sidewall 112, or the second sidewall 114. In such examples, the front wall 120 may also define at least part of the interior space 122. In such examples, the front wall 120 may form a temporary and/or releasable connection with one or more of the sidewalls 112, 114, the top 118, and/or the base 110 to facilitate inserting an item into the interior space 122 and/or removing the item from the interior space 122. Such a releasable connection may be formed utilizing one or more straps, latches, buckles, brackets, ties, Velcro® components, or other releasable connection devices (not shown).

Figure 4:
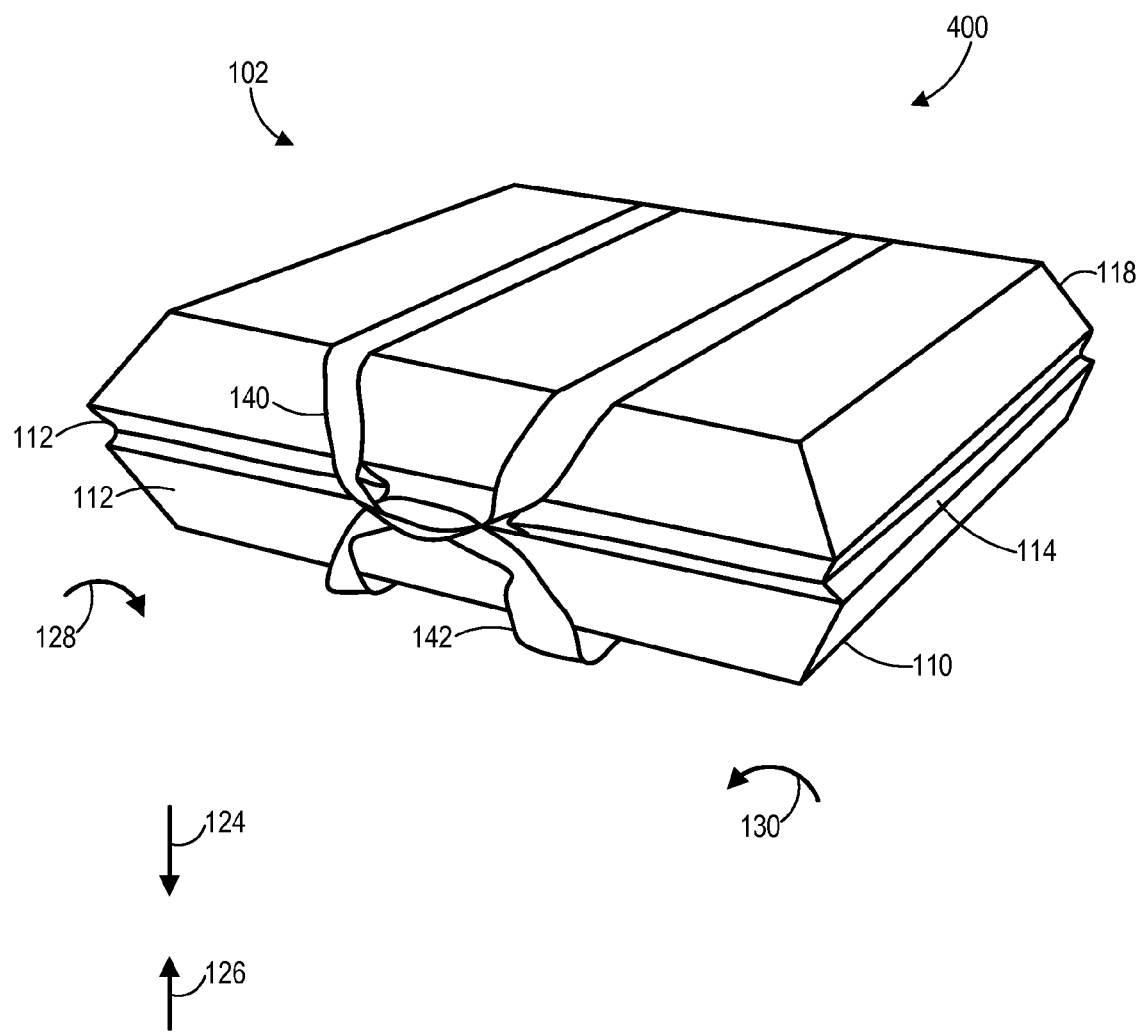
FIG. 4 illustrates the enclosure of FIG. 2 in the collapsed state.
Figure 5:
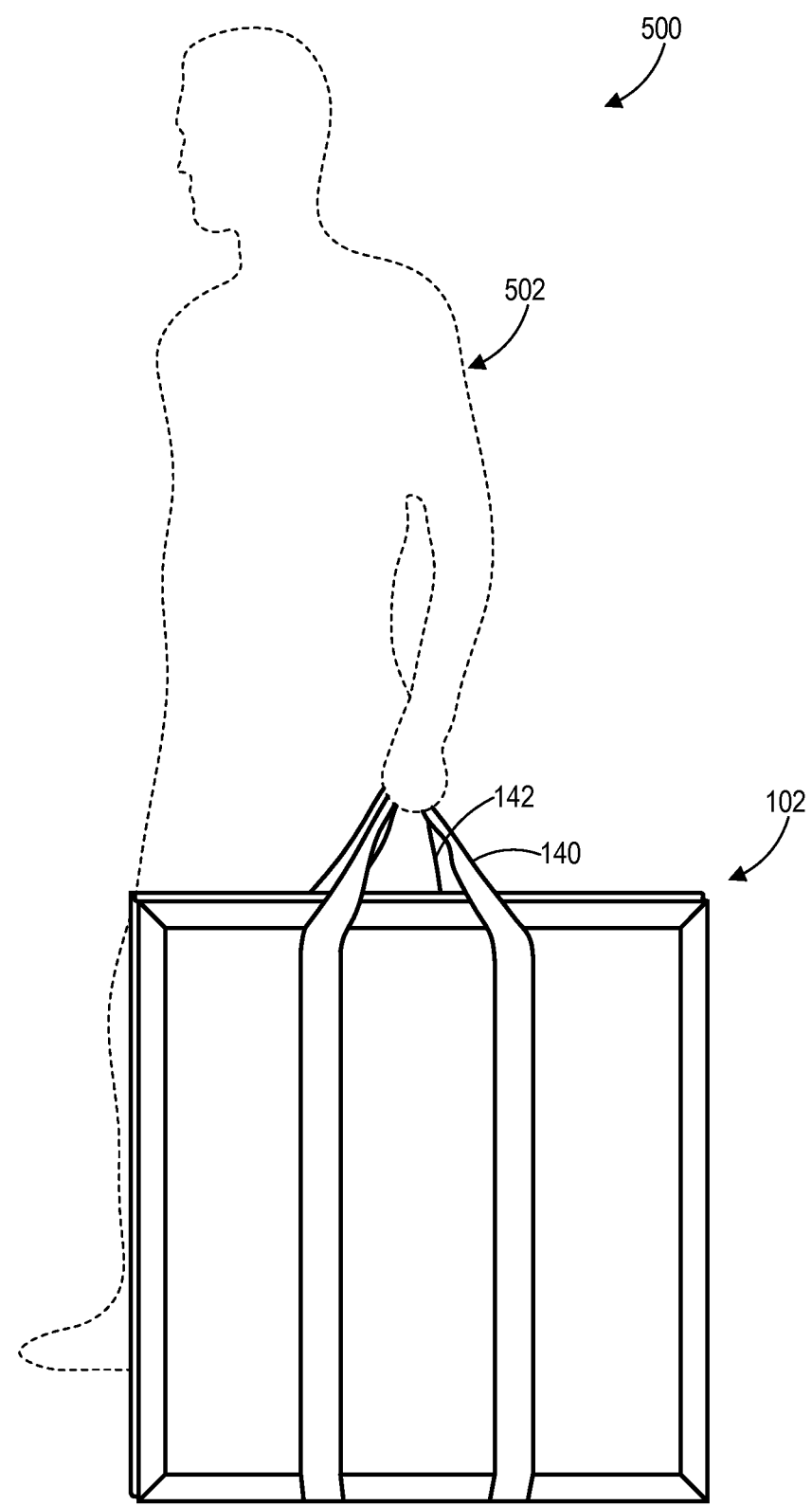
FIG. 5 illustrates another view of the enclosure of FIG. 2 in the collapsed state.

In example embodiments, the top 118 may be movable toward the base 110 in the direction of arrow 124 in order to transition the enclosure 102 from the expanded state shown in FIG. 1 to the collapsed state (FIGS. 4 and 5). Additionally or alternatively, the base 110 may be movable toward the top 118 in the direction of arrow 126 in order to transition the enclosure 102 from the expanded state to the collapsed state. As will be described in further detail below, at least one of the sidewalls 112, 114, back wall 116, front wall 120, and/or other components of the enclosure 102 may be substantially flexible, foldable, and/or otherwise movable in order to facilitate transitioning the enclosure 102 between the expanded state and the collapsed state. Additionally, the enclosure 102 may include one or more mechanisms configured to provide rigidity and/or stability to the various components of the enclosure 102 while the enclosure 102 is in the expanded state. For example, such mechanisms may be engaged in order to prevent relative movement between two or more components of the enclosure 102 and/or to maintain the enclosure 102 in the expanded state. Disengaging such mechanisms, on the other hand, may permit relative movement between two or more components of the enclosure 102 and/or may permit transition of the enclosure 102 from the expanded state to the collapsed state.

In general, at least part of the first sidewall 112 may be movable toward the interior space 122 and/or toward the second sidewall 114 as the enclosure 102 is transitioned from the expanded state to the collapsed state. Additionally or alternatively, at least part of the second sidewall 114 may be movable toward the interior space 122 and/or toward the first sidewall 112 as the enclosure 102 is transitioned from the expanded state to the collapsed state. For example, the first sidewall 112 may be bendable, foldable, and/or otherwise collapsible, such as along a score line or other like seam in the first sidewall 112, in the direction of arrow 128 toward the interior space 122. Additionally or alternatively, the second sidewall 114 may be bendable, foldable, and/or otherwise collapsible, such as along a respective score line or other like seam in the second sidewall 114, in the direction of arrow 130 toward the interior space 122. As will be described with respect to at least FIG. 2, one or more of the sidewalls 112, 114 may include respective mechanisms configured to prevent bending and/or folding of the sidewalls 112, 114, in the direction of arrows 128, 130, while the enclosure 102 is in the expanded state.

Further, the back wall 116 and/or the front wall 120 may be bendable, foldable, and/or otherwise collapsible in a similar manner in order to facilitate transitioning the enclosure 102 from the expanded state to the collapsed state. In some examples, the back wall 116 and/or the front wall 120 may be bendable and/or foldable toward the interior space 122, such as along a respective score line or other like seam. In further examples, on the other hand, the back wall 116 and/or the front wall 120 may be collapsible, similar to an accordion or other substantially flexible structure as the enclosure 102 is transitioned to the collapsed state. In still further examples, at least one of the back wall 116 or the front wall 120 may be substantially rigid and may be hingedly and/or otherwise rotatably moveable toward or away from the interior space 122 to facilitate transitioning the enclosure 102 from the expanded state to the collapsed state.

In example embodiments, the enclosure 102 may include one or more passages configured to facilitate viewing an item disposed in the interior space 122. In particular, such passages may provide access to the item and/or the interior space 122, visually or otherwise, from various locations external to the enclosure 102. Such visual access may enable a user of the enclosure 102 to capture one or more images and/or video of the item disposed within the interior space 122 via the imaging device 104. For example, the top 118 may include a passage 132 providing a line of sight 134 to the interior space 122 from a location A external to the enclosure 102. The passage 132 may comprise, for example, a channel, orifice, and/or other opening in the top 118 through which an item disposed in the interior space 122 may be viewed, such as along the line of sight 134. For example, positioning the imaging device 104 proximate, adjacent, and/or over the passage 132, such that the line of sight 134 is within a field of view of a camera of the imaging device 104, may enable the camera to obtain one or more images of the item.

Additionally or alternatively, at least one of the front wall 120, back wall 116 or sidewalls 112, 114 may include a passage similar to the passage 132 described above. For example, the front wall 120 may include a passage 136 providing a line of sight 138 to the interior space 122 from a location B external to the enclosure 102. The passage 136 may comprise, for example, a channel, orifice, and/or other opening in the front wall 120 through which an item disposed in the interior space 122 may be viewed, such as along the line of sight 138. For example, positioning imaging device 104 proximate, adjacent, and/or over the passage 136, such that the line of sight 138 is within the field of view of the camera of the imaging device 104, may enable the camera to obtain one or more images of the item.

The enclosure 102 may have any shape, size, and/or other configuration useful in facilitating the capture of images using the imaging device 104, and as noted above, such configurations may be different from those shown in FIG. 1. Further, the enclosure 102 may include one or more additional components useful in facilitating transporting and/or storing the enclosure 102 when not in use. Although not shown in FIG. 1, such components may include, for example, one or more straps, belts, buckles, ties, brackets, or other structures to assist in maintaining the enclosure in the collapsed state during transport and/or storage. Additionally, the enclosure 102 may include one or more handles 140, 142 configured to assist the user in lifting, carrying, and/or otherwise transporting the enclosure 102 while in the collapsed state. For example, a first handle 140 may be connected to the top 118 while a second handle 142 may be connected to the base 110. In further examples, one or more additional handles may be connected to at least one of the sidewalls 112, 114.

Figure 2:
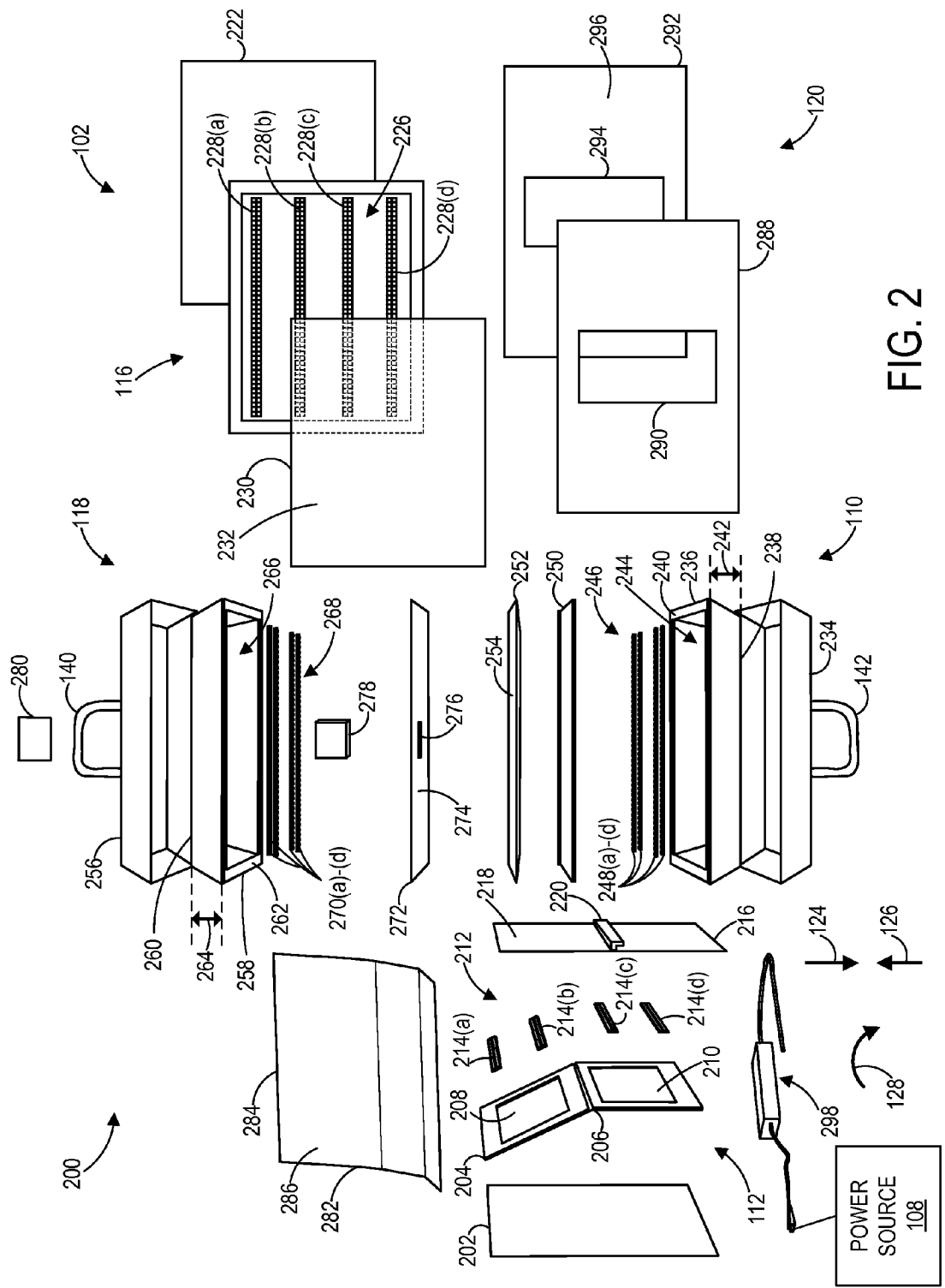
FIG. 2 illustrates an exploded view of an example enclosure of the system shown in FIG. 1.

The example embodiment 200 of FIG. 2 illustrates an exploded view of the enclosure 102 with the second sidewall 114 omitted for clarity. In the examples described herein, the first and second sidewalls 112, 114 may be substantially identical unless otherwise noted. As shown in FIG. 2, the first sidewall 112 may include a plurality of layers that are stitched, sealed, adhered, fused, molded, combined, and/or otherwise connected to form a singular wall of the enclosure 102. For example, the sidewall 112 may include an outer layer 202, and an intermediate layer 204 connected to the outer layer 202. In some examples, a surface of the outer layer 202 may comprise an outer surface of the enclosure 102. The outer layer 202 may be made from any durable, substantially water resistant, substantially tear resistant, substantially flame-retardant material configured to form a protective outer surface of the enclosure 102. In some examples, the material used to form the outer layer 202 may be substantially rigid so as to assist in forming such a protective outer layer. Alternatively, at least a portion of the outer layer 202 may be substantially flexible to allow for bending, flexing, folding, and/or other movement of various components of the first sidewall 112. In example embodiments, one or more plastics, polymers, synthetic materials, foams, or other such material may be utilized to form the outer layer 202. Such materials may include any of a variety of utility fabrics or materials such as, for example, Kevlar®, polytetrafluoroethylene, nylon, polypropylene, polyester, denier fabric, polystyrene, Mylar®, and the like. Such materials may be, for example, adhered, stitched, UV welded, heat sealed, and/or otherwise connected to a first side of the intermediate layer 204. In some examples, the outer layer 202 may be made from non-woven spunbound polypropylene or other such materials.

The intermediate layer 204 may include one or more substantially rigid components that are connected together to form a single layer of the sidewall 112. Alternatively, the intermediate layer 204 may have a substantially one-piece construction and may include one or more fold lines, score lines, die cut lines, weakened portions, and/or other like seams 206. Such seams 206 may facilitate folding, bending, and/or other relative movement between various portions of the intermediate layer 204. For example, the intermediate layer 204 may include a seam 206 extending along substantially an entire length of the intermediate layer 204, and such a seam 206 may facilitate relative movement between opposing portions of the intermediate layer 204 when the enclosure 102 is transitioned between the expanded state and the collapsed state. For example, the intermediate layer 204 may include a first panel 208 disposed on a first side of the seam 206 and a second panel 210 disposed on a second side of the seam 206 opposite the first panel 208. Each of the panels 208, 210 may comprise substantially rigid, substantially planar structures of the intermediate layer 204 configured to assist in supporting, for example, the top 118 of the enclosure 102 when the enclosure 102 is in the expanded state. The intermediate layer 204, and each of the panels 208, 210 thereof, may be made from one or more sheets of substantially rigid, substantially lightweight material. For example, one or more of the materials described above with respect to the outer layer 202 may be employed to manufacture the intermediate layer 204. Additionally or alternatively, at least part of the intermediate layer 204 may have a substantially corrugated, substantially fluted, and/or other configuration designed to provide greater structural rigidity than, for example, a non-corrugated or non-fluted intermediate layer 204 made from the same material. In example embodiments, the intermediate layer 204 may comprise a single sheet of fluted and/or corrugated polypropylene including a score line or other like seam 206 disposed between the first and second portions of the intermediate layer 204. Alternatively, the intermediate layer 204 may comprise a single sheet of extruded, blown, thermoformed, and/or other such foam including a score line or other like seam 206 disposed between the first and second portions of the intermediate layer 204. In any of the examples described herein, the first portion of the intermediate layer 204 may comprise the first panel 208 shown in FIG. 2 while the second portion of the intermediate layer 204 may comprise the second panel 210. In some examples, at least one of the first panel 208 or the second panel 210 may comprise a recessed portion of the intermediate layer 204. Such a recessed portion may facilitate mounting one or more additional components of the first sidewall 112 to the intermediate layer 204 while facilitating the formation of a substantially planar inner surface of the enclosure 102.

For example, the first sidewall 112 may include a light assembly 212, and at least part of the light assembly 212 may be connected to the intermediate layer 204, such as on at least one of the panels 208, 210 or a recessed portion thereof. The light assembly 212 may be configured to illuminate the interior space 122 of the enclosure 102, and such a light assembly 212 may have any desired configuration in order to direct a constant or variable amount of radiation to the interior space 122. In some examples, the light assembly 212 may be configured to emit and/or provide at least approximately 14,000 lumens per square foot of light to the interior space 122. Alternatively, as will be described in greater detail below, the enclosure 102 may include one or more additional light assemblies, and together, the light assemblies of the enclosure 102 may be configured to emit and/or provide at least approximately 14,000 lumens per square foot to the interior space 122. In further examples it is understood that, together or separately, the light assemblies of the enclosure 102 may be configured to emit or provide less than approximately 14,000 lumens per square foot of light.

As shown in FIG. 2, the light assembly 212 may include one or more light sources 214(a)-214(d) (collectively, "light sources 214"). Although a total of four light sources 214 are illustrated in FIG. 2, in further examples greater than or less than four light sources 214 may be used. Additionally, such light sources 214 may comprise one or more devices configured to selectively emit radiation at a desired wavelength. Such light sources 214 may comprise, for example, light emitting diodes ("LEDs") or other such devices. In the example shown in FIG. 2, such light sources 214 may comprise low profile and/or flat-panel LED strips that are embedded within and/or otherwise connected to the respective panels 208, 210 of the intermediate layer 204. In any of the embodiments described herein, the light sources 214 may have an operating temperature below approximately 50° C. such that, during use, the light sources 214 may give off no greater than approximately 50° C. Additionally, each of the light sources 214 of the light assembly 212 may be characterized by a daylight-balanced lighting temperature of less than approximately 6500 Kelvin. In some examples, the light sources 214 may be characterized by a daylight-balanced lighting temperature of between approximately 5500 Kelvin and approximately 6500 Kevin. Further, each light source 214 may be configured to emit or provide at least approximately 500 lumens per square foot of light to the interior space 122, and in some examples, each light source 214 may be configured to emit or provide between approximately 700 lumens per square foot and approximately 900 lumens per square foot. Such lighting parameters may provide for optimal image capturing conditions within the interior space 122 and may assist in generating, for example, substantially shadowless images with the imaging device 104.

The first sidewall 112 may also include an inner layer 216 disposed opposite the intermediate layer 204 and/or opposite the outer layer 202. The inner layer 216 may be stitched, sealed, adhered, fused, molded, combined, and/or otherwise connected to the intermediate layer 204 so as to overlay at least one of the panels 208, 210. Additionally, the inner layer 216 may overlay at least one of the light sources 214 of the light assembly 212 disposed on the intermediate layer 204. The inner layer 216 may be made from semi and/or fully transparent material configured to facilitate the passage of light and/or other radiation therethrough. For example, the inner layer 216 may be configured to permit passage of at least a portion of the light emitted by the light assembly 212 to the interior space 122. In some examples, the inner layer 216 may also be configured to collimate, diffuse, reflect, refract, filter, focus, and/or otherwise condition light and/or other radiation impinging thereon. Accordingly, in some examples, the inner layer 216 may comprise one or more layers of semi-transparent diffusive material overlaying the light assembly 212. The inner layer 216 may be made from any of the materials described above with respect to the outer layer 202 and/or the intermediate layer 204 to facilitate such functionality. Additionally or alternatively, the inner layer 216 may be made from a substantially heat resistant polymer, synthetic material, fabric, or other such material configured to diffuse and/or reflect light. In the example shown in FIG. 2, the inner layer 216 may comprise one or more acrylic diffusion sheets. Such diffusion sheets may have a substantially one-piece construction or, alternatively, multiple sheets of material may be stitched, sealed, adhered, fused, molded, combined, and/or otherwise connected to form the inner layer 216. In some examples, the inner layer 216 of at least one of the sidewalls 112, 114, and/or of any other component of the enclosure 102 including a light assembly 212 (e.g., the base 110, back wall 116, top 118, and/or front wall 120) may be made from Mylar® or other similar materials. Such materials may provide a desirable level of collimation, diffusion, reflection, refraction filtering, focusing, reduction, directionality, and/or other conditioning to the light or other radiation emitted by the respective light assembly 212. Such materials may also provide a great deal of design flexibility in moving, positioning, and/or otherwise locating the respective light assemblies on, for example, a particular intermediate layer 204 corresponding to the inner layer 216. Additionally, such materials may be highly reflective and, as a result, may enable fewer light assemblies 212 to be included in the enclosure 102 while still providing adequate light conditions (as described herein) within the interior space 122.

In example embodiments, a surface 218 of the inner layer 216 opposite the intermediate layer 204 may comprise an inner surface of the enclosure 102. Such a surface 218 may have any desirable color, optical characteristics, and/or other configuration useful in providing a desirable environment for image capture within the interior space 122. For example, the surface 218 may be matted white, off-white, pure white, silver, and/or any other color to assist in producing relatively high quality photographic images.

The first sidewall 112 may also include a tension mechanism 220. The tension mechanism 220 may be, for example, connected to the inner layer 216 and accessible via the interior space 122 of the enclosure 102. Such a tension mechanism 220 may be configured to prevent folding and/or bending of the first sidewall 112 when the enclosure 102 is in the expanded state and the tension mechanism 220 is engaged. For example, regardless of whether the inner layer 216 comprises a one-piece construction or a two-piece construction, engaging the tension mechanism 220 may draw, for example, the first panel 208 of the intermediate layer 204 in the direction of arrow 124 and toward the second panel 210. Additionally, engaging the tension mechanism 220 may draw the second panel 210 of the intermediate layer 204 in the direction of arrow 126 and toward the first panel 208. As a result, engaging the tension mechanism 220 may cause the first panel 208 to be disposed substantially coplanar with the second panel 210. Further, the tension and/or other force provided by the tension mechanism 220 to the intermediate layer 204 may prevent the first panel 208 from bending, folding, and/or otherwise moving relative to the second panel 210 while the enclosure 102 is in the expanded state. In example embodiments, the tension mechanism 220 may comprise one or more zippers, electromagnets, straps, ties, brackets, and/or other devices connected to the inner layer 216 and configured to provide the functionality described above.

In example embodiments, one or more walls of the enclosure 102 may include structures, components, and/or configurations that are similar to and/or the same as those described above with respect to the first sidewall 112. For example, the second sidewall 114 may be substantially identical to the first sidewall 112. Alternatively, one or more components of the first sidewall 112 may be omitted from the second sidewall 114. Additionally, the back wall 116 may have a configuration similar to that of the first and second sidewalls 112, 114. For example, the back wall 116 may include an outer layer 222, and a surface of the outer layer 222 may comprise an outer surface of the enclosure 102. The outer layer 222 may be made from any durable, substantially water resistant, substantially tear resistant, substantially flame-retardant material configured to form a protective outer surface of the enclosure 102 and, in some examples, any of the materials used to form the outer layer 202 may also be used to form the outer layer 222 of the back wall 116. At least a portion of the outer layer 222 may be substantially flexible and may allow the back wall 116 to collapse upon itself when the enclosure 102 is transitioned from the expanded state to the collapsed state. Alternatively, at least a portion of the back wall 116 may be substantially rigid in order to facilitate bending, folding, and/or other movement of the back wall 116 in a direction toward the interior space 122 when the enclosure 102 is transitioned to the collapsed state. For example, the back wall 116 may comprise a substantially rigid wall of the enclosure 102 that is rotatably connected to the top 118, the base 110, or one of the sidewalls 112, 114. For example, the back wall 116 may be configured to rotate in a direction toward the top 118 when the enclosure 102 is transitioned to the collapsed state. Additionally, the back wall 116 may be configured to rotate in a direction away from the top 118 when the enclosure 102 is transitioned to the expanded state. The top 118 may be disposed substantially perpendicular to the sidewalls 112, 114, the top 118, and the base 110, and may provide support to the top 118 when the enclosure 102 is in the expanded state.

The outer layer 222 may be stitched, sealed, adhered, fused, molded, combined, and/or otherwise connected to a first side of an intermediate layer 224 of the back wall 116. The intermediate layer 224 may include one or more substantially rigid components that are connected to form a single layer of the back wall 116. Alternatively, the intermediate layer 224 may have a substantially one-piece construction, and may be substantially rigid or substantially flexible to facilitate bending, folding, collapsing, and/or other movement of the back wall 116 as described above. In some examples, the intermediate layer 224 may include one or more fold lines, score lines, weakened portions, and/or seams (not shown) similar to the seams 206 described above. Such seams of the intermediate layer 224 may facilitate folding, bending, and/or other relative movement between various portions of the intermediate layer 224.

The intermediate layer 224 may be made from one or more sheets of substantially rigid, substantially lightweight material. For example, one or more of the materials described above with respect to the intermediate layer 204 of the sidewall 112 may be employed to manufacture the intermediate layer 224 of the back wall 116. For example, the intermediate layer 224 may comprise a single sheet of fluted and/or corrugated polypropylene, and may include one or more score lines or other like seams. Alternatively, the intermediate layer 224 may comprise a sheet of foam.

In some examples, the back wall 116 may also include a light assembly 226. For example, at least part of the light assembly 226 may be embedded within and/or connected to the intermediate layer 224 and configured to illuminate the interior space 122. The light assembly 226 may be substantially similar to the light assembly 212 described above and may include one or more light sources 228(*a*)-228(*d*) (collectively, "light sources 228"). Although a total of four light sources 228 are illustrated in FIG. 2, in further examples greater than or less than four light sources 228 may be used on the back wall 116. The light sources 228 may comprise any of the devices described above with respect to the light sources 214. For example, the light sources 228 may comprise LEDs and/or any other devices configured to selectively emit radiation at a desired wavelength. In some examples, the light sources 228 may comprise low profile and/or flat-panel LED strips that are connected to the intermediate layer 224. The light sources 228, and the light assembly 226 generally, may have any of the output ranges, operating temperatures, lighting temperatures, and/or other characteristics described above with respect to the light assembly 212 and/or the light sources 214.

The back wall 116 may also include an inner layer 230 disposed opposite the intermediate layer 224 and/or opposite the outer layer 222. The inner layer 230 may, for example, be connected to the intermediate layer 224 so as to overlay at least one of the light sources 228 of the light assembly 226. The inner layer 230 may be made from any of the materials described above with respect to the inner layer 216. For example, the inner layer 230 may comprise a semi and/or fully transparent material configured to facilitate passage of light and/or other radiation therethrough. In some examples, the inner layer 230 may also be configured to collimate, diffuse, reflect, refract, filter, focus, and/or otherwise condition light and/or other radiation impinging thereon. Accordingly, in some examples, the inner layer 230 may comprise one or more layers of semi-transparent diffusive material overlaying the light assembly 226. In the example shown in FIG. 2, the inner layer 230 may comprise one or more acrylic diffusion sheets, and a surface 232 of the inner layer 230 opposite the intermediate layer 224 may comprise an inner surface of the enclosure 102. Similar to the surface 218 of the first sidewall 112, the surface 232 may be matted white, off-white, pure white, silver, and/or any other color to assist in producing relatively high quality digital images.

With continued reference to FIG. 2, the base 110 may include an outer layer 234 formed from any of the materials described above with respect to the outer layers 202, 222. The base 110 may also include a substantially rigid tray structure 236 providing stiffness and/or structural integrity to the base 110. In such examples, the outer layer 234 may be stitched, sealed, adhered, fused, molded, combined, and/or otherwise connected to the tray structure 236 so as to form an outer surface of the enclosure 102. The tray structure 236 may comprise a substantially one-piece construction and, in such embodiments, the tray structure 236 may be formed through any injection molding, thermoforming, extrusion, and/or other formation process. Additionally or alternatively, one or more components of the tray structure 236 may be stitched, sealed, adhered, fused, molded, combined, and/or otherwise connected together. The tray structure 236 and its components may be formed from any of the materials described above with respect to the intermediate layers 204, 224. For example, one or more components of the tray structure 236 may be made from one or more pieces or sheets of fluted and/or corrugated polypropylene.

In example embodiments, the tray structure 236 may include one or more components configured to define a recess or other like cavity within the base 110. Such a cavity may be useful in, for example, providing natural diffusion of light and/or other radiation emitted by a light assembly that may be disposed within the cavity. In particular, by disposing such a light assembly within the cavity such that the light assembly is spaced from one or more structures of the base 110 forming a bottom and/or support surface of the interior space 122, such spacing may enable light emitted by the light assembly to diffuse naturally prior to impinging upon such support surfaces. Such diffusion caused by the configuration of the tray structure 236 (e.g., spacing created by the cavity) may improve the image quality of photos or other images captured using the enclosure 102. Additionally, in some embodiments such diffusion may enable one or more substantially transparent diffusive layers of the base 110 to be omitted, thereby reducing the cost and complexity of the enclosure 102.

As shown in FIG. 2, the tray structure 236 may include a substantially planar plate 238 extending substantially parallel to the top 118, and a plurality of legs 240 extending from the plate 238 in a direction generally toward the top 118. In some examples, the legs 240 may extend substantially perpendicularly from the plate 238. In other examples, however, at least one of the legs 240 may extend from the plate 238 at an obtuse included angle. Accordingly, as shown in FIG. 2, the tray structure 236 may have a substantially trapezoidal three-dimensional shape, and at least one of the legs 240 may extend from the plate 238 so as to form a gap 242 between a topmost surface of the plate 238 and a topmost surface of the at least one leg 240. In this way, the gap 242 formed between the topmost surface of the plate 238 and the topmost surface of the at least one leg 240 may define at least a portion of a cavity 244 of the tray structure 236. In particular, one or more components of the base 110 disposed on the topmost surface of the plate 238 may be spaced from one or more additional components of the base 110 disposed on and/or supported by the topmost surface of the at least one leg 240 by a distance equal to a vertical height of the gap 242.

The base 110 may also include a light assembly 246. In some examples, the light assembly 246 may be embedded within and/or connected to the plate 238. In particular, the light assembly 246 may be connected to the topmost surface of the plate 238 and may be configured to illuminate at least a portion of the interior space 122. The light assembly 246 may be substantially similar to the light assembly 212 described above and may include one or more light sources 248(a)-248(d) (collectively, "light sources 248"). Although a total of four light sources 248 are illustrated in FIG. 2, in further examples greater than or less than four light sources 248 may be employed by the base 110. The light sources 248 may comprise any of the devices described above with respect to the light sources 214. For example, the light sources 248 may comprise LEDs and/or any other devices configured to selectively emit radiation at a desired wavelength. In some examples, the light sources 248 may comprise low profile and/or flat-panel LED strips that are connected to the topmost surface of the substantially planar plate 238. As a result, the light assembly may be spaced from one or more structures of the base 110, such as a substantially planar platen 250 and/or an inner layer 252, forming a bottom and/or support surface of the interior space 122. In particular, the light sources 248 may be spaced from the platen 250 and/or the inner layer 252 by a distance equal to a vertical height of the gap 242, and such spacing may enable light emitted by the light sources 248 to diffuse naturally prior to impinging upon such structures of the base 110.

In example embodiments, the platen 250 may comprise a layer of substantially rigid semi-transparent material disposed opposite the plate 238 and supported by at least one of the legs 240. In example embodiments, the platen 250 may be supported by and/or otherwise connected to the topmost surfaces of each of the legs 240, and the platen 250 may extend substantially parallel to the topmost surface of the plate 238. In such examples, the platen 250 may form at least a portion of the cavity 244. The platen 250 may be made from any of the materials described above with respect to the outer layer 202, the intermediate layer 204, and/or the inner layer 216. For example, in the embodiment 200 shown in FIG. 2 the platen 250 may comprise a substantially transparent sheet of polyethylene or any other polymer configured to provide a substantially rigid support surface and/or platform for items disposed within the interior space 122.

The inner layer 252 may, in some examples, be stitched, sealed, adhered, fused, molded, combined, and/or otherwise connected to the platen 250 so as to overlay at least part of the platen 250 as well as at least one of the light sources 248 of the light assembly 246. The inner layer 252 may be made from any of the materials described above with respect to the inner layer 216. For example, the inner layer 252 may comprise a semi and/or fully transparent material configured to facilitate passage of light and/or other radiation therethrough. In some examples, the inner layer 252 may also be configured to collimate, diffuse, reflect, refract, filter, focus, and/or otherwise condition light and/or other radiation impinging thereon. Accordingly, in some examples, the inner layer 252 may comprise one or more layers of semi-transparent diffusive material overlaying the light assembly 246 of the base 110. In the example shown in FIG. 2, the inner layer 252 may comprise one or more acrylic diffusion sheets, and a surface 254 of the inner layer 252 opposite the platen 250 may comprise an inner surface of the enclosure 102. Similar to the surface 218 of the first sidewall 112, the surface 254 may be matted white, off-white, pure white, silver, and/or any other color to assist in producing relatively high quality photographic images. Additionally, in some examples the platen 250 may be configured to collimate, diffuse, reflect, refract, filter, focus, and/or otherwise condition light and/or other radiation impinging thereon. In such examples, the platen 250 may also be matted white, off-white, pure white, silver, and/or any other color to assist in producing relatively high quality photographic images. Accordingly, in some examples, the inner layer 252 may be omitted from the base 110.

With continued reference to FIG. 2, the top 118 may have a configuration that is substantially similar to the base 110. For example, the top 118 may include an outer layer 256 similar to and/or formed from any of the materials described above with respect to the outer layers 202, 222, 234. The top 118 may also include a substantially rigid tray structure 258 providing stiffness and/or structural integrity to the top 118, and the tray structure 258 of the top 118 may be substantially similar to the tray structure 236 of the base 110. In some examples, the top 118 may also includes a substantially clear acrylic hook or other attachment device configured to support jewelry or other objects within the interior space 122.

For example, the outer layer 256 may be connected to the tray structure 258 so as to form an outer surface of the enclosure 102. The tray structure 258 may comprise a substantially one-piece construction and, in such embodiments, the tray structure 258 may be formed through any injection molding, thermoforming, extrusion, and/or other formation process. Additionally or alternatively, one or more components of the tray structure 258 may be stitched, sealed, adhered, fused, molded, combined, and/or otherwise connected together. The tray structure 258 and its components may be formed from any of the materials described above with respect to the intermediate layers 204, 224. For example, one or more components of the tray structure 258 may be made from one or more pieces or sheets of fluted and/or corrugated polypropylene.

In example embodiments, the tray structure 258 may include one or more components configured to define a recess or other like cavity within the top 118. Such components may include a substantially planar plate 260 extending substantially parallel to the base 110, and a plurality of legs 262 extending from the plate 260 in a direction generally toward the base 110. In some examples, the legs 262 may extend substantially perpendicularly from the plate 260. In other examples, however, at least one of the legs 262 may extend from the plate 260 at an obtuse included angle. Accordingly, as shown in FIG. 2, the tray structure 258 may have a substantially trapezoidal three-dimensional shape, and at least one of the legs 262 may extend from the plate 260 so as to form a gap 264 between a topmost surface of the plate 260 and a topmost surface of the at least one leg 262. In this way, the gap 264 formed between the topmost surface of the plate 260 and the topmost surface of the at least one leg 262 may define at least a portion of a cavity 266 of the tray structure 258.

The top 118 may also include a light assembly 268. In some examples, the light assembly 268 may be embedded within and/or otherwise connected to the plate 260. In particular, the light assembly 268 may be connected to the topmost surface of the plate 260 and may be configured to illuminate at least a portion of the interior space 122. The light assembly 268 may be substantially similar to the light assembly 212 described above and may include one or more light sources 270(*a*)-270(*d*) (collectively, "light sources 270"). Although a total of four light sources 270 are illustrated in FIG. 2, in further examples greater than or less than four light sources 270 may be employed by the top 118. The light sources 270 may comprise any of the devices described above with respect to the light sources 214. For example, the light sources 270 may comprise LEDs and/or any other devices configured to selectively emit radiation at a desired wavelength. In some examples, the light sources 270 may comprise low profile and/or flat-panel LED strips that are adhered and/or otherwise connected to the topmost surface of the substantially planar plate 260. As a result, the light assembly 268 may be spaced from one or more structures of the top 118, such as an inner layer 272 having a surface 274 forming an inner surface of the interior space 122. In particular, the light sources 270 may be spaced from the inner layer 272 by a distance equal to a vertical height of the gap 264, and such spacing may enable light emitted by the light sources 270 to diffuse naturally prior to impinging upon the inner layer 272.

The example embodiments of the enclosure 102 described herein may be configured to provide studio quality light dimensionality and, thus, may facilitate obtaining relatively high quality digital images of objects disposed within the interior space 122. For example, one or more of the light assemblies described herein, and the corresponding inner layer overlaying at least part of the respective light assembly, may facilitate obtaining substantially shadowless images with minimal specularity, and one or more additional light assemblies may provide directional accent illumination while the image is being captured. Such directional accent illumination or "fill" illumination may, for example, provide additional front and/or side reflection during image capture sessions and may add softness, sharpness, or other desired dramatic effects to the captured image. In this way, such directional accent illumination may improve the overall quality of the image obtained using the enclosure. In some examples, at least one of the light assemblies 226 (of the back wall 116), 246 (of the base 110), 268 (of the top 118) may be employed for illuminating the interior space 122 and substantially eliminating shadows. In such examples, at least one of the additional light assemblies 212 (of the sidewalls 112, 114) included in the enclosure 102 may provide at least a portion of the directional accent illumination described above.

The inner layer 272 may, in some examples, be connected to the legs 262 and/or other components of the tray structure 258 so as to overlay at least one of the light sources 270 of the light assembly 268. The inner layer 272 may be made from any of the materials described above with respect to the inner layer 216. For example, the inner layer 272 may comprise a semi and/or fully transparent material configured to facilitate passage of light and/or other radiation therethrough. In some examples, the inner layer 272 may also be configured to collimate, diffuse, reflect, refract, filter, focus, and/or otherwise condition light and/or other radiation impinging thereon. Accordingly, in some examples, the inner layer 272 may comprise one or more layers of semitransparent diffusive material overlaying the light assembly 268 of the top 118. In the example shown in FIG. 2, the inner layer 272 may comprise one or more acrylic diffusion sheets. Similar to the surface 218 of the first sidewall 112, the surface 274 may be matted white, off-white, pure white, silver, and/or any other color to assist in producing relatively high quality photographic images.

In some examples, the inner layer 272 may include one or more openings 276. Such openings 276 may comprise at least a portion of the passage 132 described above, and may assist in providing the line of sight 134 to the interior space 122. In such examples, the outer layer 256, plate 260, and/or other components of the top 118 may also include openings substantially aligned with and/or otherwise having substantially the same shape, size, location, and/or other configurations of the opening 276. In such examples, the various openings formed by components of the top 118 may assist in forming at least a portion of the passage 132.

The top 118 may also include a plug 278 removably disposed within the passage 132. For example, the plug 278 may comprise a piece of foam, cloth, polymer, acrylic, and/or other material configured to substantially fill the passage 132 when the passage 132 is not in use. For example, a bottom surface of the plug 278 may mate with the surface 274 and may be disposed substantially coplanar with the surface 274 while the plug 278 is disposed within the passage 132. Additionally, the bottom surface of the plug 278 may be matted white, off-white, pure white, silver, and/or any other color so as to match a color of the surface 274. Further, the top 118 may include a cover 280 hingedly, rotatably, and/or otherwise movably connected to the outer layer 256. For example, a first part of the cover 280 may be fixedly connected to the outer layer 256 while a second part of the cover 280 may be removably connected to the outer layer 256 (e.g., via one or more ties, Velcro® strips, or other connection components) in order to facilitate opening and closing of the cover 280. Opening the cover 280 may expose the passage 132 and/or the plug 278. Alternatively, in some examples the cover 280 may be completely removed from the outer layer 256 in order to expose the passage 132 and/or the plug 278. The plug 278 may be accessed and/or removed from the passage 132 by opening or removing the cover 280. The cover 280 may be made from any of the materials described herein with respect to, for example, the outer layer 202 and/or other components of the enclosure 102.

With continued reference to the embodiment 200 shown in FIG. 2, in some examples the enclosure 102 may also include one or more layers 282 of semi-transparent material movably disposed within the interior space 122. For example, the enclosure 102 may include one or more such layers 282 connected to at least one of the top 118, the base 110, the back wall 116, the first sidewall 112, or the second sidewall 114. In such embodiments, the layer 282 may be movable to any desired position within the enclosure 102 in order to provide additional diffusion of light and/or other radiation emitted by one or more of the light assemblies described above. For example, a top and/or side 284 of the layer 282 may be connected to at least one of the top 118 or the back wall 116, and the layer 282 may have a length sufficient to overlay at least a portion of the base 110. In particular, the layer 282 may overlay at least a portion of the light assembly 246 of the base 110. In such examples, the layer 282 may also overlay at least a portion of the light assembly 226 of the back wall 116. In such examples, the layer 282 may provide additional diffusion of visible light emitted by both the light assembly 226 and the light assembly 246. Such additional diffusion may be desirable in certain situations in order to achieve sharper images, greater contrast between different colors and/or surfaces of the item being imaged, and/or otherwise improved image characteristics.

In example embodiments, the layer 282 may be made from any of the materials described above with respect to the inner layer 216. For example, the layer 282 may comprise one or more layers of a semi and/or fully transparent material configured to facilitate passage of light and/or other radiation therethrough. In some examples, the layer 282 may also be configured to collimate, diffuse, reflect, refract, filter, focus, and/or otherwise condition light and/or other radiation impinging thereon. In the example shown in FIG. 2, the layer 282 may comprise one or more acrylic diffusion sheets. Additionally, the layer 282 may include a surface 286 forming at least part of an inner surface of the interior space 122. Similar to the surface 218 of the first sidewall 112, the surface 286 may be matted white, off-white, pure white, silver, and/or any other color to assist in producing relatively high quality photographic images.

The front wall 120 of the enclosure 102 may include one or more layers that are similar to and/or the same as the various layers described above with respect to the sidewalls 112, 114 and/or the back wall 116. For example, front wall 120 may include an outer layer 288 having an opening 290, and a surface of the outer layer 288 may comprise an outer surface of the enclosure 102. The outer layer 288 may be made from any durable, substantially water resistant, substantially tear resistant, material configured to form a protective outer surface of the enclosure 102 and, in some examples, any of the materials used to form the outer layer 202 may also be used to form the outer layer 288 of the front wall 120. At least a portion of the outer layer 288 may be substantially flexible and may allow the front wall 120 to bend, roll-up, and/or collapse upon itself when the enclosure 102 is transitioned from the expanded state to the collapsed state. Alternatively, at least a portion of the front wall 120 may be substantially rigid in order to facilitate bending, folding, and/or other movement of the front wall 120 in a direction toward the interior space 122 when the enclosure 102 is transitioned to the collapsed state.

The front wall 120 may be stitched, sealed, adhered, fused, molded, combined, and/or otherwise connected to at least one of the top 118, the base 110, the first sidewall 112, or the second sidewall 114. Additionally, the front wall 120 may be removably connected to one or more of the top 118, the base 110, the first sidewall 112, or the second sidewall 114. In this way, the front wall 120 may be opened and/or removed in order to provide access to the interior space 122 of the enclosure 102. Providing access in this way may facilitate, for example, disposing an item to be photographed within the interior space 122 and/or removing the item from the interior space 122.

The opening 290 of the outer layer 288 may comprise at least a portion of the passage 136 described above, and may assist in providing the line of sight 138 to the interior space 122. In such examples, an inner layer 292 and/or other components of the front wall 120 may also include an opening 294 substantially aligned with and/or otherwise having substantially the same shape, size, location, and/or other configurations of the opening 290. In such examples, the various openings formed by components of the front wall 120 may assist in forming at least a portion of the passage 136. Further, the front wall 120 may include a cover (not shown) similar to the cover 280 described above. For example, a first part of the cover of the front wall 120 may be fixedly connected to the outer layer 288 while a second part of the cover may be removably connected to the outer layer 288 in order to facilitate opening and closing of the cover. Opening the cover of the front wall 120 may expose the passage 136, and the cover may be made from any of the materials described herein with respect to, for example, the outer layer 202 and/or other components of the enclosure 102.

The inner layer 292 may, for example, be connected to the outer layer 288 so as to overlay at least a portion of the outer layer 288. The inner layer 292 may be made from any of the materials described above with respect to the inner layer 216. For example, the inner layer 292 of the front wall 120 may comprise a semi and/or fully transparent material configured to facilitate passage of light and/or other radiation therethrough. In some examples, the inner layer 292 may also be configured to collimate, diffuse, reflect, refract, filter, focus, and/or otherwise condition light and/or other radiation impinging thereon. Accordingly, in some examples, the inner layer 292 may comprise one or more layers of semi-transparent diffusive material, and a surface 296 of the inner layer 292 may comprise and/or otherwise form an inner surface of the enclosure 102. In the example shown in FIG. 2, the inner layer 292 may comprise one or more acrylic diffusion sheets. Similar to the surface 218 of the first sidewall 112, the surface 296 may be matted white, off-white, pure white, silver, and/or any other color to assist in producing relatively high quality photographic images.

In the example embodiment 200 shown in FIG. 2, the enclosure 102 may be selectively connected to the power source 108, and the power source 108 may comprise a wall outlet, a battery pack, and/or any other supply of alternating current or direct current. In examples in which the power source 108 comprises a wall outlet providing approximately 120 volts of alternating current, an example system 100 of the present disclosure may further include one or more adapters 298 configured to convert the current to direct current. The power source 108 and/or the adapter 298 may transmit such direct current to the one or more light assemblies of the enclosure 102.

Figure 3A:
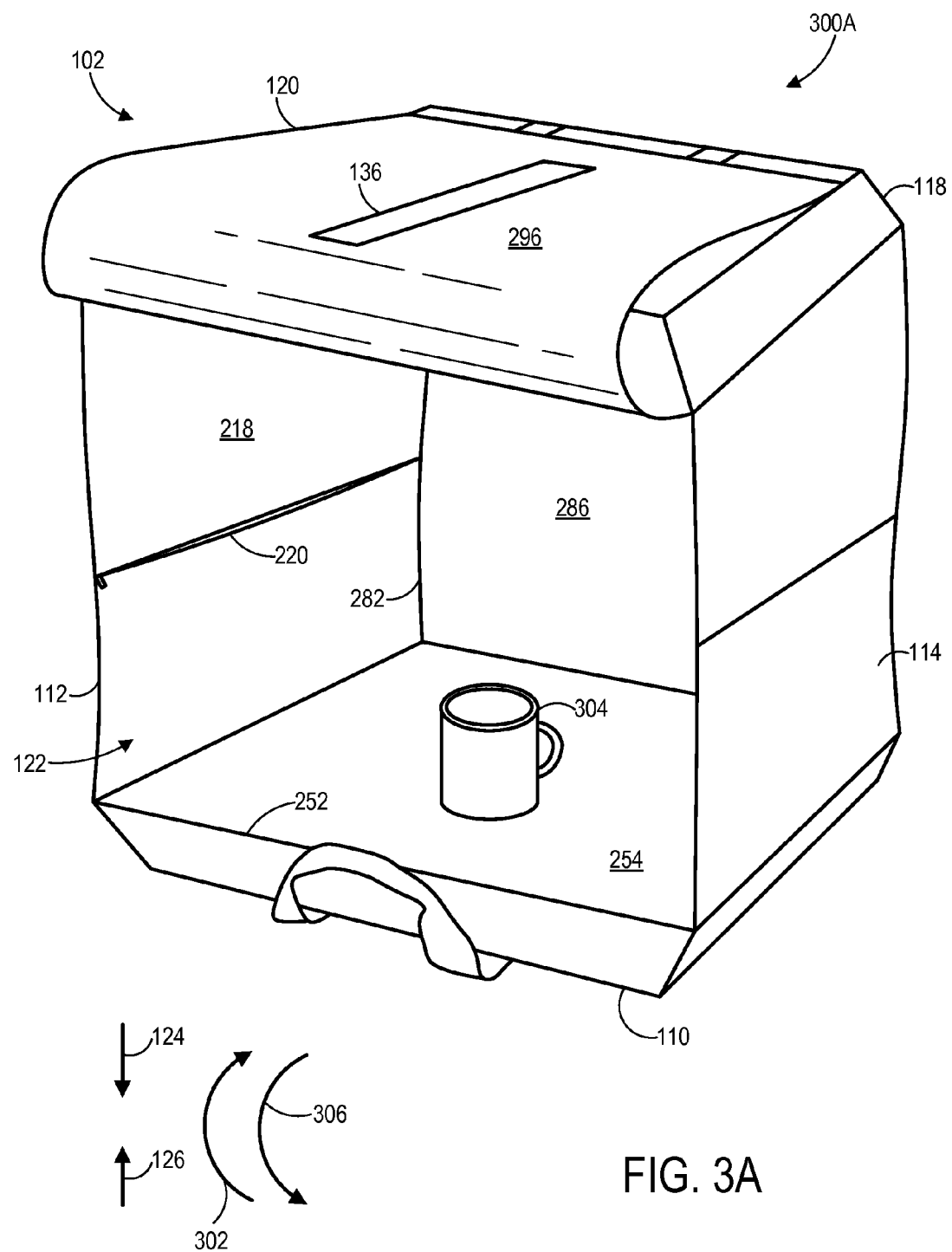
FIG. 3A illustrates the enclosure of FIG. 2 in an open state.

FIG. 3A illustrates an example embodiment 300A of the enclosure 102 in the expanded state. For example, during use the top 118 may be moved in the direction of arrow 126 away from the base 110. As the top 118 is moved in the direction of arrow 126, the first and second sidewalls 112, 114 may pivot into the respective positions shown in FIG. 3A such that the first and second sidewalls 112, 114 extend substantially perpendicularly from the top 118 and the base 110. Additionally, the back wall 116 may extend substantially perpendicularly from the top 118 and the base 110 when the enclosure 102 is in the expanded state. To maintain the enclosure 102 in the expanded state, the respective tension mechanisms 220 of the sidewalls 112, 114 may be engaged, thereby prohibiting bending, folding, and/or other movement of the sidewalls 112, 114. Additionally, the layer 282 may be positioned so as to overlay at least a portion of the surface 232 of the back wall 116 and/or at least a portion of the surface 254 of the inner layer 252. For example, the layer 282 may be sized and/or otherwise configured to extend from the top 118 and to overlay substantially the entire back wall 116 and substantially the entire surface 254 of the inner layer 252.

A user of the enclosure 102 may additionally rotate, fold, and/or otherwise move the front wall 120 in the direction of arrow 302 in order to expose the interior space 122 of the enclosure 120. With at least a portion of the interior space 122 exposed, the user may dispose one or more items 304 within the interior space 122. For example, the user may dispose an item 304 on the surface 254 of the base 110. Alternatively, in examples in which the layer 282 overlays at least a portion of the surface 254, the user may dispose the item 304 on at least part of the surface 286 of the layer 282. With the item 304 positioned as desired, the user may rotate, fold, and/or otherwise move the front wall 120 in the direction of arrow 306 in order to substantially close the enclosure 102. Once configured in this way, the user may capture one or more images of the item 304, via one or more of the passages 136, 132 of the enclosure 102, using the imaging device 104.

Figure 3B:
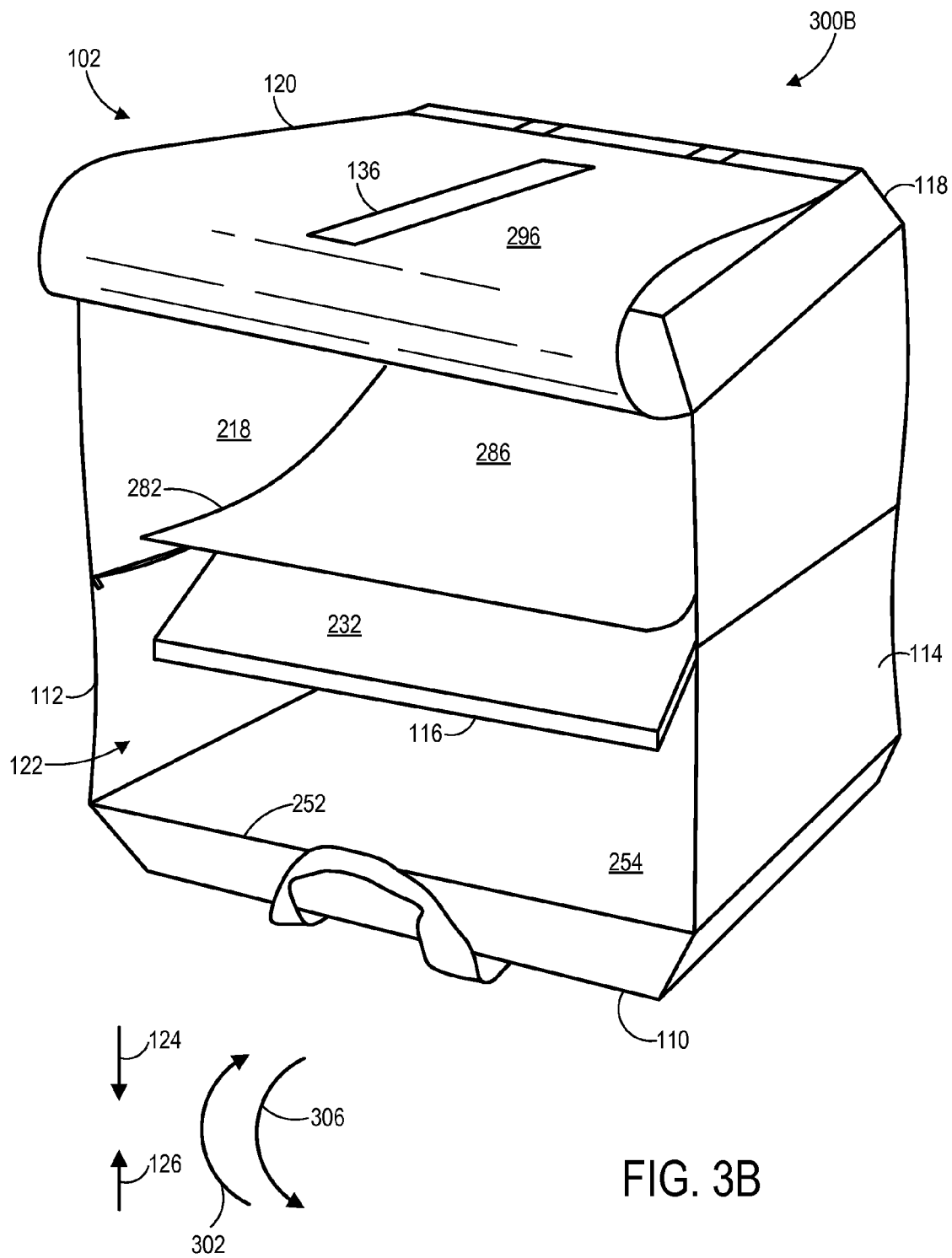
FIG. 3B illustrates the enclosure of FIG. 2 while in transition between the open state and a collapsed state.

FIG. 3B illustrates an example embodiment 300B of the present disclosure in which the enclosure 102 is in transition between the expanded state and the collapsed state. For example, in order to transition the enclosure 102 from the expanded state shown in FIG. 3A to an example collapsed state, a user may rotate, pivot, and/or otherwise move both the layer 282 and the back wall 116 in the direction of arrow 302. In this way, the user may move the layer 282 and the back wall 116 away from the base 110 and toward the top 118. Once positioned proximate and/or substantially adjacent to the surface 274 of the inner layer 272 (FIG. 2), the user may disengage the tension mechanisms 220 to facilitate bending, folding, and/or other movement of the sidewalls 112, 114. The user may also move the base 110 and/or the top 118 as desired to transition the enclosure to the collapsed state.

FIG. 4 illustrates a further example embodiment 400 of the present disclosure in which the enclosure 102 has been transitioned to the collapsed state. As described above, in order to transition the enclosure 102 to the collapsed state the top 118 may be moved toward the base 110 in the direction of arrow or 124 and/or the base 110 may be moved toward the top 118 in the direction of arrow 126. In such a collapsed state, the first and second sidewalls 112, 114 may be folded, bent, and/or otherwise moved in a direction toward the interior space 122. For example, the first sidewall 112 may bend and/or otherwise fold along the seam 206 of the intermediate layer 204 in the direction of arrow 128 as the enclosure 102 is transitioned to the collapsed state. Similarly, the second sidewall 114 may bend and/or otherwise fold along the respective seam 206 of the intermediate layer 204 in the direction of arrow 130 as the enclosure 102 is transitioned to the collapsed state. Additionally, the first and second panels 208, 210 of the first and second sidewalls 112, 114, respectively, may extend substantially parallel to the base 110 and/or the top 118 when the enclosure 102 is in the collapsed state. Once in the collapsed state, the user may engage one or more straps, buckles, brackets, ties, latches, and/or other retention components of the enclosure 102 (not shown) configured to maintain the enclosure 102 in the collapsed state and to otherwise prohibit enclosure 102 from transitioning to the expanded state.

Once in the collapsed state, the enclosure 102 may be easily stored and/or transported by the user. For example, as shown in the example embodiment 500 of FIG. 5 a user 502 may transport the enclosure 102 by grasping the handles 140, 142 thereof and lifting the enclosure 102 substantially vertically. Once the user 502 has transported the enclosure 102 to a new desired location, the user 502 may transition the enclosure 102 from the collapsed state to the expanded state as described above.

Figure 6:
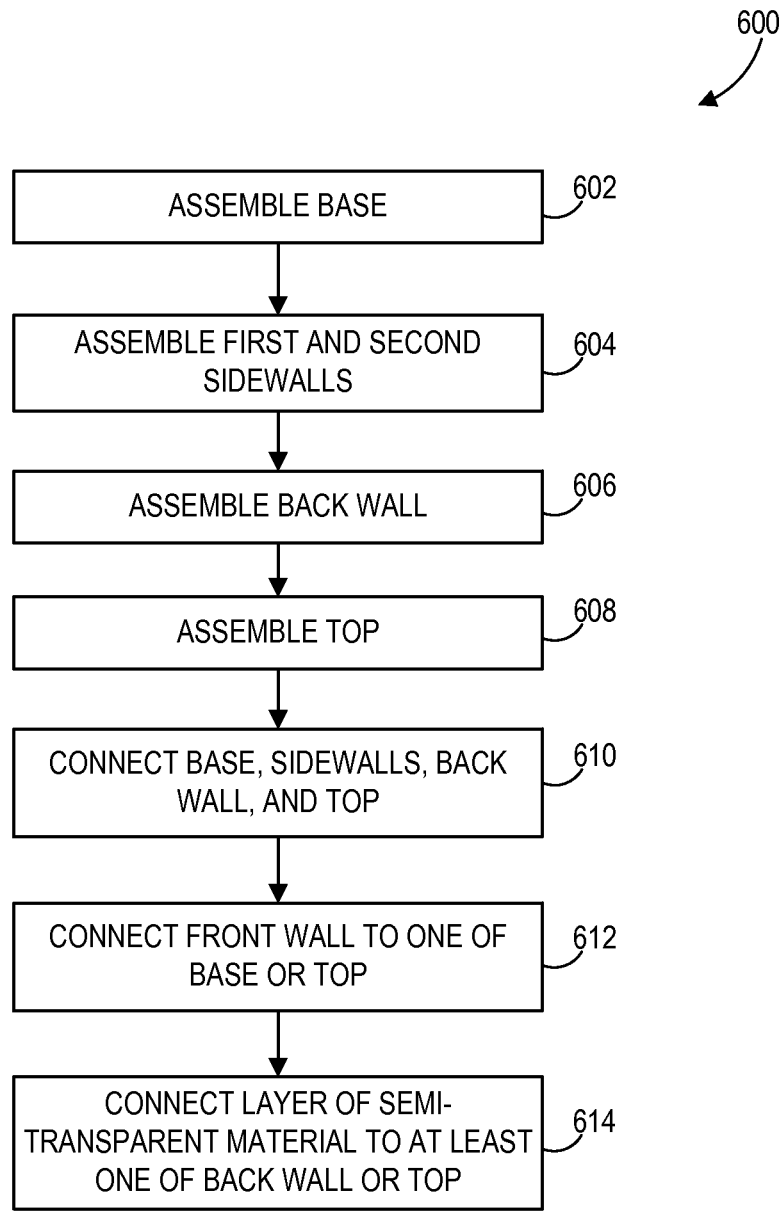
FIG. 6 illustrates a flow diagram of an example method of manufacturing an enclosure.

FIG. 6 illustrates an example method 600 of manufacturing a collapsible photo enclosure 102 of the present disclosure. In some instances, the method 600, or portions thereof, may be repeated one or more times in order to assist in manufacturing the enclosure 102. The example method 600 is illustrated as a collection of blocks in a logical flow diagram, which represent a sequence of operations, some or all of which can be implemented manually, automatically by one or more manufacturing machines, in hardware, in software, and/or a combination thereof. The order in which the operations are described should not be construed as a limitation. Any number of the described blocks can be combined in any order and/or in parallel to implement the process, or alternative processes, and not all of the blocks need be executed. For discussion purposes, the methods herein are described with reference to the system 100 and the enclosure 102, although the method 600 may be implemented in a wide variety of other systems, frameworks, architectures, or environments.

The description of the various methods may include certain transitional language and directional language, such as "then," "next," "thereafter," "subsequently," "returning to," "continuing to," "proceeding to," etc. These words, and other similar words, are simply intended to guide the reader through the graphical illustrations of the methods and are not intended to limit the order in which the method steps depicted in the illustrations may be performed.

As will be described below, the method 600 includes assembling the base 110, first and second sidewalls 112, 114, back wall 116, and top 118 of the enclosure 102. The method 600 also includes connecting one or more of the sidewalls 112, 114, and/or the back wall 116 to the base 110, and connecting the top 118 to the sidewalls 112, 114 and/or to the back wall 116. The method may further include connecting the front wall 120 to at least one of the base 110 or the top 118. For example, at 602 the method 600 includes assembling the base 110 by combining one or more of the components of the base 110 described above. For example, the base 110 may include at least one of the outer layer 234, the tray structure 236, the light assembly 246, the platen 250, or the inner layer 252. Accordingly at 602 the method 600 may include connecting the outer layer 234 to the tray structure 236 and connecting the light assembly 246 to a topmost surface of the plate 238. Accordingly, the light assembly 246 may be disposed within the cavity 244 at least partly defined by the plate 238 and the plurality of legs 240 extending from the plate 238. Additionally, at 602 at least one of the platen 250 and/or the inner layer 252 may be connected to the plurality of legs 240. In this way, the at least one of the platen 250 and/or the inner layer 252 may be disposed opposite the substantially planar plate 238 when assembly of the base 110 is complete.

At 604, the method 600 may include assembling at least one of the first and second sidewalls 112, 114. In particular, at 604 the method 600 may include connecting the light assembly 212 to the intermediate layer 204 of the sidewall 112 and/or connecting an additional light assembly 212 to a respective intermediate layer 204 of the sidewall 114. Such an example method may also include stitching, sealing, adhering, fusing, molding, combining, and/or otherwise connecting the inner layer 216 to the intermediate layer 204 of the first sidewall 112 such that the inner layer 216 overlays at least a portion of the light assembly 212. In particular, one or more light sources 214 may be disposed on and/or otherwise connected to respective panels 208, 210 of the intermediate layer 204. In such embodiments, the inner layer 216 may be connected to the intermediate layer 204 so as to overlay at least one of the light sources 214 disposed thereon.

Further, at 604 the intermediate layer 204 may be connected to the outer layer 202. Additionally, in some examples one or more tension mechanisms 220 may be connected to the inner layer 216. As described above, such a tension mechanism 220 may comprise a zipper or other like device configured to prohibit folding, bending, and/or other like movement of the first sidewall 112 when the enclosure 102 is in the expanded state. It is understood that at 604 one or more of the steps described above may also be performed in order to manufacture and/or otherwise form the second sidewall 114.

At 606, the method 600 may include assembling the back wall 116. In particular, at 606 the light assembly 226 may be stitched, sealed, adhered, fused, molded, combined, and/or otherwise connected to the intermediate layer 224 of the back wall 116. Additionally, the outer layer 222 may be connected to intermediate layer 224, and the inner layer 230 may be connected to intermediate layer 224 such that the inner layer 230 overlays at least a portion of the light assembly 226. In particular, the inner layer 230 may be connected to the intermediate layer 224 such that the inner layer 230 overlays at least one of the light sources 228 disposed on the intermediate layer 224.

At 608, the method 600 may include assembling the top 118. In particular, at 608 the outer layer 256 may be stitched, sealed, adhered, fused, molded, combined, and/or otherwise connected to the tray structure 258, and the light assembly 268 may be connected to a topmost surface of the plate 260. Additionally, at 608 the inner layer 272 may be connected to the topmost surface of one or more of the legs 262.

At 610, the method 600 may include connecting the first and second sidewalls 112, 114 to, for example, the base 110. As noted above, the sidewalls 112, 114 may be connected to the base 110 in any number of ways including stitching, adhering, sealing, fusing, molding, and/or other known methods. As a result of the connection formed at 610, the first and second sidewalls 112, 114 may extend substantially perpendicularly from the base 110 when, for example, the enclosure 102 is in the expanded state. At 610 the back wall 116 may also be connected to the base 110 through any of the above connection methods. Additionally, at 610 the method 600 may include connecting the top 118 to the sidewalls 112, 114 and/or to the back wall 116. As a result of such connections, the back wall 116 may extend from the first sidewall 112 to the second sidewall 114. Additionally, the top 118 may be disposed opposite the base 110. As described above, the top 118 may be movable toward the base 110 in the direction of arrow 124 to assist in transitioning the enclosure 102 from the expanded state to the collapsed state. Additionally, the base 110 may be movable toward the top 118 in the direction of arrow 126 to assist in transitioning the enclosure 102 from the expanded state to the collapsed state.

It is understood that one or more of the steps described herein may include assembling the front wall 120 described above. For example, the method 600 may include stitching, adhering, sealing, fusing, molding, and/or otherwise connecting the inner layer 292 to the outer layer 288 to form the front wall 120 of the present disclosure. At 612, the method 600 may also include connecting the front wall 120 to at least one of the base 110, the top 118, the first sidewall 112, or the second sidewall 114. As noted above, the front wall 120 may be movably connected to at least one of the base 110, the top 118, the first sidewall 112, or the second sidewall 114 in order to facilitate providing access to the interior space 122 during use of the enclosure 102.

At 614, the method 600 may further include stitching, fusing, sealing, adhering, and/or otherwise connecting the layer 282 to at least one of the back wall 116, the top 118, the base 110, the first sidewall 112, or the second sidewall 114. As described above, the layer 282 may be connected to one or more of the above components of the enclosure 102 at the top 284 and/or side thereof. Additionally, the layer 282 may be connected to such enclosure components so as to be movable relative to the various components of the enclosure 102 within the interior space 122.

As noted above, example embodiments of the present disclosure provide a photo enclosure that is relatively lightweight, and that is easily collapsible and expandable. The enclosure defines an interior space that is shaped, sized, and/or otherwise configured to accept one or more items to be photographed therein. For example, the enclosure includes one or more light sources configured to illuminate the interior space while an image of the item is being captured. Such light assemblies may be disposed within and/or otherwise connected to the sidewalls and/or to the back wall of the enclosure. Additionally or alternatively, at least one of the base or the top of the enclosure may include respective light assemblies configured to further illuminate the interior space. Further, one or more components of the enclosure may include a layer of semi-transparent diffusive material overlaying at least a portion of the respective light assemblies to assist in illuminating the interior space. Such layers of diffusive material may be, for example, off-white, pure white, or any other color configured to improve the overall quality of the captured image.

In particular, due to the above configurations of the example enclosures described herein the resulting images of the item captured by the imaging device 104 may be substantially free from shadows. Additionally or alternatively, the example enclosures of the present disclosure may reduce and/or substantially eliminate specular reflection of radiation emitted by the light assemblies and directed to the interior space 122. Such images of the item may also have a sharpness, brightness, clarity, resolution, contrast, and/or other optical characteristics sufficient to satisfy the stringent image quality requirements of known online retailers and/or other websites to which the resulting image may be transferred and/or uploaded.

Known systems, on the other hand, may not enable users to obtain images of items disposed therein with great clarity and/or without shadows or other imperfections. As a result, images obtained using known systems typically require further modification and/or processing before such images meet the various image quality requirements of most online retailers. Such additional image processing increases the overall time and cost of the imaging process and is therefore undesirable. Accordingly, the example systems and methods of the present disclosure offer unique and heretofore unworkable approaches to digital imaging. Such systems and methods simplify the process of obtaining high quality images and, thus, improve user satisfaction.

CONCLUSION

Although the techniques have been described in language specific to structural features and/or methodological acts, it is to be understood that the appended claims are not necessarily limited to the features or acts described. Rather, the features and acts are described as example implementations of such techniques.

Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

The invention claimed is:

1. A collapsible photo enclosure, comprising:
a base;
a first sidewall extending from the base;
a second sidewall extending from the base and positionable opposite the first sidewall;
a top disposed opposite the base, the top being moveable toward the base to transition the photo enclosure from an expanded state to a collapsed state;
a back wall positionable between the first sidewall and the second sidewall, and connected to one of the top or the base; and
a layer of semi-transparent diffusive material connected to at least one of the back wall or the top, wherein
the layer is configured to overlay at least a portion of the base,
at least one of the first sidewall, the second sidewall, the top, the back wall, or the base includes a light assembly,
the top, the back wall, the first and second sidewalls, and the base define at least part of an interior space of the photo enclosure,
at least one of the first sidewall, the second sidewall, or the back wall is foldable in a direction toward the interior space as the photo enclosure is transitioned from the expanded state to the collapsed state.

2. The collapsible photo enclosure of claim 1, further comprising a front wall positionable opposite the back wall and connected to one of the base or the top, at least one of the front wall or the top including a passage providing a line of sight to the interior space from a location external to the photo enclosure.

3. The collapsible photo enclosure of claim 1, wherein the layer of semi-transparent diffusive material is movably disposed within the interior space, the enclosure further including an additional layer of semi-transparent diffusive material overlaying the light assembly.

4. The collapsible photo enclosure of claim 1, wherein the light assembly is connected to the top, and wherein the top includes an additional layer of semi-transparent diffusive material overlaying the light assembly, the additional layer of diffusive material forming at least part of the interior space.

5. The collapsible photo enclosure of claim 1, wherein the first sidewall includes a first tension mechanism and the second sidewall includes a second tension mechanism, the first and second tension mechanisms being configured to prevent folding of the first and second sidewalls, respectively, when the photo enclosure is in the expanded state.

6. An enclosure, comprising:
a base;
a top disposed opposite the base, the top being moveable toward the base to transition the enclosure from an expanded state to a collapsed state;
a plurality of walls, each wall of the plurality of walls being connected to at least one of the top or the base;
a layer of semi-transparent diffusive material connected to at least one of the back wall or the top; and
a light assembly configured to illuminate an interior space of the enclosure at least partly defined by the base and the plurality of walls, wherein
the layer is configured to overlay at least a portion of the base,
at least one wall of the plurality of walls includes a first panel and a second panel movable relative to the first panel, and
the first and second panels extend substantially parallel to the base when the enclosure is in the collapsed state.

7. The enclosure of claim 6, wherein the at least one of the top or the base comprises a substantially planar plate, a plurality of legs extending from the plate, and an additional layer of semi-transparent diffusive material disposed opposite the plate and at least partly supported by the plurality of legs, the at least one of the top or the base defining a gap extending from the plate to the layer of semi-transparent material.

8. The enclosure of claim 7, further comprising an additional light assembly connected to the plate and configured to illuminate the interior space.

9. The enclosure of claim 7, further comprising a substantially transparent platen disposed adjacent to the additional layer of semi-transparent material and at least partly supported by the plurality of legs, the platen extending substantially parallel to the plate.

10. The enclosure of claim 6, wherein the at least one wall includes an additional layer of semi-transparent diffusive material overlaying the light assembly, a surface of the additional layer forming at least part of the interior space.

11. The enclosure of claim 10, wherein the additional layer of semi-transparent diffusive material includes a tension mechanism configured to prevent movement of the first panel relative to the second panel when the enclosure is in the expanded state, wherein engaging the tension mechanism draws the first panel toward the second panel and draws the second panel toward the first panel.

12. The enclosure of claim 6, wherein the layer of semi-transparent diffusive material is connected to the top and is movably disposed within the interior space.

13. The enclosure of claim 6, wherein the plurality of walls further includes a back wall positionable substantially perpendicular to the base and the at least one wall when the enclosure is in the expanded state, and wherein the layer of semi-transparent diffusive material comprises a first layer, the back wall including:
   an additional light assembly configured to illuminate the interior space, and
   a second layer of semi-transparent diffusive material overlaying the additional light assembly, a surface of the second layer forming at least a first part of the interior space.

14. The enclosure of claim 13, wherein the plurality of walls further includes a front wall positionable opposite the back wall and connected to one of the base or the top, the front wall including a third layer of semi-transparent diffusive material forming at least a second part of the interior space.

15. The enclosure of claim 14, wherein at least one of the front wall or the top includes a passage providing a line of sight to the interior space from a location external to the enclosure.

16. The enclosure of claim 6, wherein the light assembly comprises at least one light emitting diode and is characterized by an output of greater than approximately 500 lumens per square foot.

17. A method of manufacturing an enclosure, comprising:
   connecting a first light assembly to at least one of a wall, a top, or a base of the enclosure;
   connecting the wall to the base of the enclosure such that the wall is positionable substantially perpendicular to the base;
   connecting a layer of semi-transparent diffusive material to the top; and
   connecting the wall to the top of the enclosure such that the wall is positionable substantially perpendicular to the top, the top being disposed opposite the base and being moveable toward the base to transition the enclosure from an expanded state to a collapsed state, the wall, the top, and the base defining at least part of an interior space of the enclosure, wherein
   the layer is configured to overlay at least a portion of the base,
   the wall includes a first panel and a second panel moveable relative to the first panel, and
   the first and second panels extend substantially parallel to the base, and are disposed between the top and the base, when the enclosure is in the collapsed state.

18. The method of claim 17, wherein at least one of the top or the base comprises a substantially planar plate and a plurality of legs extending from the plate, the method further comprising connecting an additional layer of semi-transparent diffusive material to the base proximate the plurality of legs, the additional layer being disposed opposite the plate.

19. The method of claim 17, further comprising connecting a tension mechanism to the wall, the tension mechanism being configured to prevent movement of the first panel relative to the second panel when the enclosure is in the expanded state, wherein engaging the tension mechanism draws the first panel toward the second panel and draws the second panel toward the first panel.

20. The method of claim 17, wherein the enclosure further includes a back wall, the method further comprising:
   connecting the back wall to one of the top or the base,
   connecting a second light assembly to the back wall, and
   connecting an additional layer of semi-transparent diffusive material to the back wall such that the additional layer overlays the second light assembly.

21. The method of claim 17, wherein the enclosure further includes a front wall, the method further comprising:
   connecting the front wall to one of the base or the top, and
   connecting an additional layer of semi-transparent diffusive material to the front wall, the additional layer forming at least part of the interior space of the enclosure.

* * * * *